United States Patent
Fujita et al.

(10) Patent No.: US 11,574,062 B2
(45) Date of Patent: Feb. 7, 2023

(54) APPLICATION DEVELOPMENT ASSISTANCE SYSTEM AND APPLICATION DEVELOPMENT ASSISTANCE METHOD

(71) Applicant: Hitachi, Ltd., Tokyo (JP)

(72) Inventors: Junya Fujita, Tokyo (JP); Hidemichi Ogasawara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 210 days.

(21) Appl. No.: 17/022,199

(22) Filed: Sep. 16, 2020

(65) Prior Publication Data

US 2021/0303697 A1 Sep. 30, 2021

(30) Foreign Application Priority Data

Mar. 26, 2020 (JP) .............................. JP2020-056103

(51) Int. Cl.
*G06F 21/57* (2013.01)
*G06F 8/77* (2018.01)

(52) U.S. Cl.
CPC .............. *G06F 21/577* (2013.01); *G06F 8/77* (2013.01); *G06F 2221/033* (2013.01)

(58) Field of Classification Search
CPC .... G06F 21/577; G06F 8/77; G06F 2221/033; G06F 8/30; G06F 8/20
See application file for complete search history.

(56) References Cited

U.S. PATENT DOCUMENTS

| | | | |
|---|---|---|---|
| 2006/0242711 A1 | 10/2006 | Anzai et al. | |
| 2013/0091543 A1* | 4/2013 | Wade | G06F 21/53 726/1 |
| 2016/0021117 A1 | 1/2016 | Harmon et al. | |
| 2019/0265954 A1 | 8/2019 | Kaneko et al. | |
| 2020/0159934 A1* | 5/2020 | Yamaguchi | G06F 8/75 |
| 2021/0216643 A1* | 7/2021 | Mishra | G06F 21/577 |
| 2022/0027477 A1* | 1/2022 | Hercock | G06N 3/0445 |

FOREIGN PATENT DOCUMENTS

| | | |
|---|---|---|
| JP | 2006-331383 A | 12/2006 |
| JP | 2017-522667 A | 8/2017 |
| JP | 2019-148859 A | 9/2019 |

* cited by examiner

*Primary Examiner* — Meng Li

(74) *Attorney, Agent, or Firm* — Mattingly & Malur, PC

(57) ABSTRACT

An application development assistance system in which optimal security measures can be taken at positions in need of security measures under an application development environment using a flow diagram analyzes an input application description file and outputs application data information and module information. A data importance level judgment unit decides importance levels of data exchanged between modules on the basis of the application data information. A module exploitability judgment unit decides an exploitability score of each module on the basis of the module information and exploitability information read out from a module exploitability database; and a security function disposal position judgment unit decides disposal positions of security functions on the basis of data importance level information decided by the data importance level judgment unit, the exploitability score of each module decided by the module exploitability judgment unit, and security measure information read out from a security measure information database.

8 Claims, 5 Drawing Sheets

APPLICATION DEVELOPMENT ASSISTANCE SYSTEM AND APPLICATION DEVELOPMENT ASSISTANCE METHOD

CLAIM OF PRIORITY

The present application claims priority from Japanese Patent application serial no. 2020-056103, filed on Mar. 26, 2020, the content of which is hereby incorporated by reference into this application.

BACKGROUND OF THE INVENTION

The present invention relates to technologies for assisting application developments under a software development circumstance using flow diagrams, and particularly to a technology effective for security measures of applications.

In software developments, it becomes possible to realize an environment under which even an inexperienced programmer can develop applications comparatively easily by adopting a programming language in which descriptions are made using flow diagrams. On the other hand, because appropriate security measures are not taken, how to secure the securities of developed applications is an important problem to be solved.

As a background art in this technological field, there is Japanese Unexamined Patent Application Publication No. 2006-331383, for example. Japanese Unexamined Patent Application Publication No. 2006-331383 discloses a system security design/evaluation assistance tool deriving an assurance level of security for each of components of a subject system operating on an information processing apparatus and made up of one or more components, the system security design/evaluation assistance tool including: a threat-to-component correspondence table storing therein association relations between threats assumed by the subject system and security functions provided by the target system; a risk-value table storing therein information about risk values showing the magnitudes of the risks of the respective threats; a component contribution ratio table storing therein information about the magnitudes of the effects of the security functions provided by the components that counters the respective threats; a risk-to-assurance level association relation table storing therein association relations between risk values and assurance levels required corresponding to the risk values; a table link/usage unit specifying the coordination relations among the threat-to-component association relation table, the risk-value table, the component contribution ratio table, and the risk-to-assurance level association relation table on the basis of duplicated items among the respective tables; and a component assurance level derivation unit deriving the assurance levels of the respective components corresponding to the risk values of the threats that the security functions of the components counter by weighting the risk values of the threats with the component contribution ratios on the basis of the coordination relations among the respective tables.

In addition, Japanese Unexamined Patent Application Publication No. 2019-148859 discloses a computer program for causing a computer apparatus to execute: (A) presenting one or more second node candidates, which are one or more candidates of a second node, in the case where a first node is selected regarding a flow being edited under a model development environment using a flow diagram, wherein the first node is any node corresponding to one type of the type of an input node and the type of an output node, and the second node is a node corresponding to the first node among nodes corresponding to any type of the other type of the type of the input node and the type of the output node and the type of an input/output node which can serve as both input node and output node; and (B) presenting one or more partial flow candidates, which are one or more candidates of a partial flow between the first node and the second node in the case where any second node candidate is selected as the second node from the one or more second node candidates.

Furthermore, Japanese Unexamined Patent Application Publication (Translation of PCT Application) No. 2017-522667 discloses an apparatus including: a communication module in which at least one of a memory and a processor is implemented and that is configured to electronically communicate with a client device and a set of resources; a policy definition module configured to define a resource reliability criterion for each resource of the set of resources on the basis of (1) a threat reliability vector associated with a set of risk mitigation scores corresponding to each threat of a set of threats and (2) a set of resource exploitability scores corresponding to each threat of the set of threats; and a policy application module configured to (1) receive each signal showing an authentication request associated with each resource of the set of resources via the communication module and (2) define a resource reliability value for each resource of the set of resources on the basis of the threat reliability vector associated with the authentication request and the set of resource exploitability scores, wherein the policy application module is configured to (1) compare the resource reliability value for each resource of the set of resources with the resource reliability criterion for each resource of the set of resources and (2) transmit a signal showing an affirmative authentication via the communication module when the resource reliability criterion for each resource of the set of resources is satisfied so that the client device is allowed to access to each resource.

SUMMARY OF THE INVENTION

Incidentally, in application developments, information security is defined as information composed of three elements, that is, "Confidentiality", "Integrity", and "Availability". The information security is referred to as "CIA" made up of the initial letters of these three elements.

In addition, the priorities of security measures are decided by the degree of "Impact×Likelihood", that is, by the magnitude of "(Security) Risk".

"Impact" is decided by "Value of Current Data", that is, by the three elements: "Confidentiality", "Integrity", and "Availability". Furthermore, "Likelihood" is decided by the number and degrees of pieces of "Exploitability" (exploitability scores).

Therefore, development assistances in which these elements are taken into consideration are needed for the security measures of application developments.

However, there are not descriptions about "exploitability scores" in any of Japanese Unexamined Patent Application Publication No. 2006-331383 and Japanese Unexamined Patent Application Publication No. 2019-148859, and because security measures in which consideration is given to priorities are not taken, there is a possibility that loads on development systems increase and optimal security measures are not taken at positions in need of security measures.

In addition, in Japanese Unexamined Patent Application Publication (Translation of PCT Application) No. 2017-522667, because an application development using a flow diagram is not a subject application development, there are no descriptions about security measures for an application development using a flow diagram.

An object of the present invention is to provide an application development assistance system and an application development assistance method in which optimal security measures can be taken at positions in need of security measures under an application development environment using a flow diagram.

In order to solve the above problem, one aspect of the present invention provides an application development assistance system for assisting an application development using a flow diagram, including: an application file analysis unit for analyzing an input application description file and outputting application data information and module information; a data importance level judgment unit for deciding importance levels of data exchanged between modules on the basis of the application data information; a module exploitability judgment unit for deciding an exploitability score of each module on the basis of the module information and exploitability information read out from a module exploitability database; and a security function disposal position judgment unit for deciding disposal positions of security functions on the basis of data importance level information decided by the data importance level judgment unit, the exploitability score of each module decided by the module exploitability judgment unit, and security measure information read out from a security measure information database.

Furthermore, another aspect of the present invention is an application development assistance method for assisting an application development using a flow diagram, including the steps of: reading and analyzing an application description file and obtaining application data information and module information; deciding importance levels of data exchanged between modules on the basis of the application data information; deciding an exploitability score of each module on the basis of the module information and exploitability information read out from a module exploitability database; and deciding disposal positions of security functions on the basis of the importance levels of the data exchanged between the modules, the exploitability score of each module, and security measure information read out from a security measure information database.

According to the present invention, an application development assistance system and an application development assistance method in which optimal security measures can be taken at positions in need of security measures under an application development environment using a flow diagram can be provided.

With this, an application in which optimal security measures are taken can be developed comparatively easily.

Problems, configurations, and advantageous effects other than the above will be explicitly shown by the descriptions of the following embodiments.

DETAILED DESCRIPTION OF THE PREFERRED EMBODIMENTS

Figure 1:
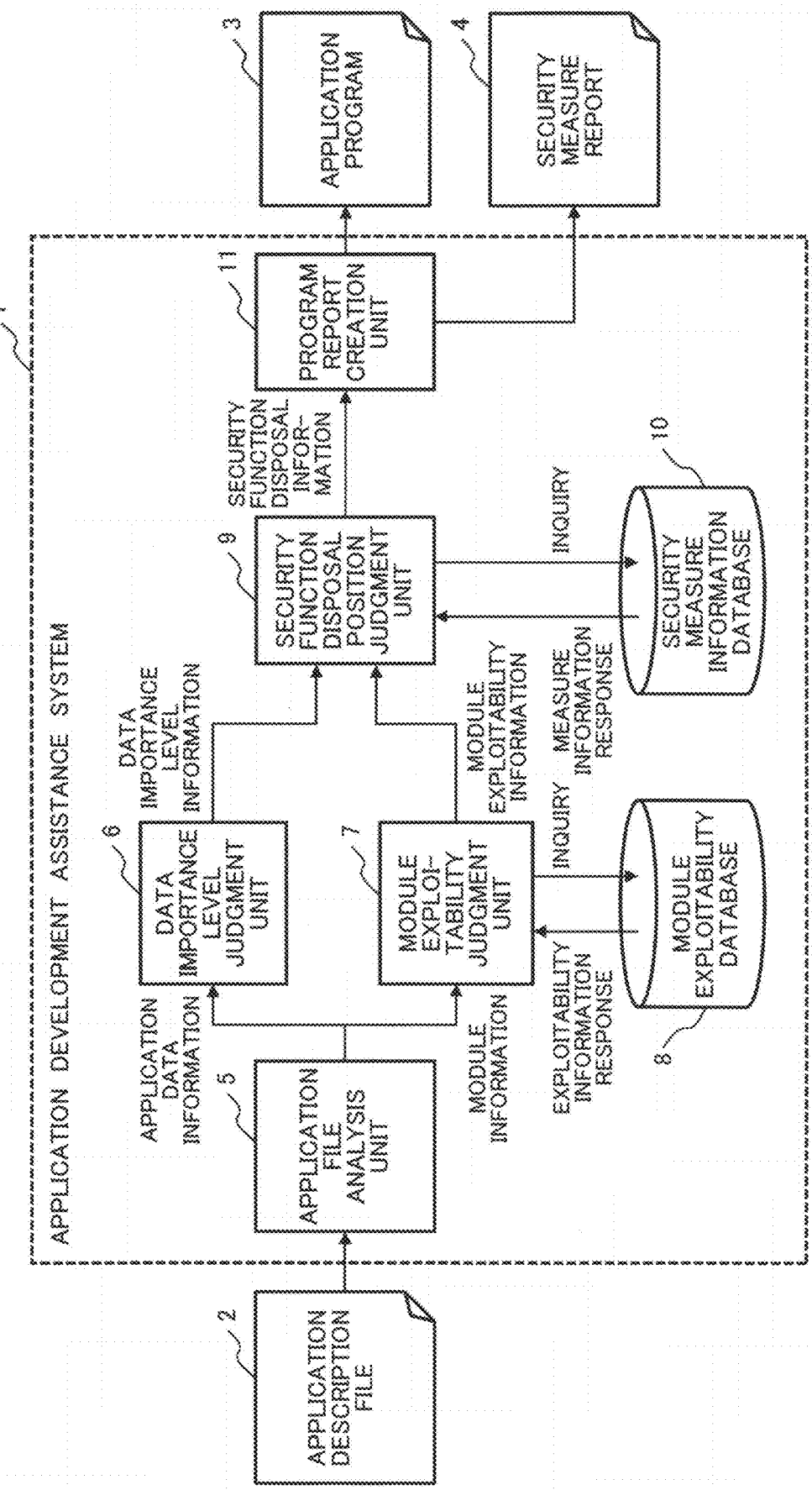
FIG. 1 is a diagram showing the whole configuration of an application development assistance system according to a first embodiment of the present invention.

The embodiments of the present invention will be explained with reference to the accompanying drawings below. Here, the same components in the drawings are given the same reference signs, and detailed descriptions about duplicated portions are omitted.

First Embodiment

Figure 2:
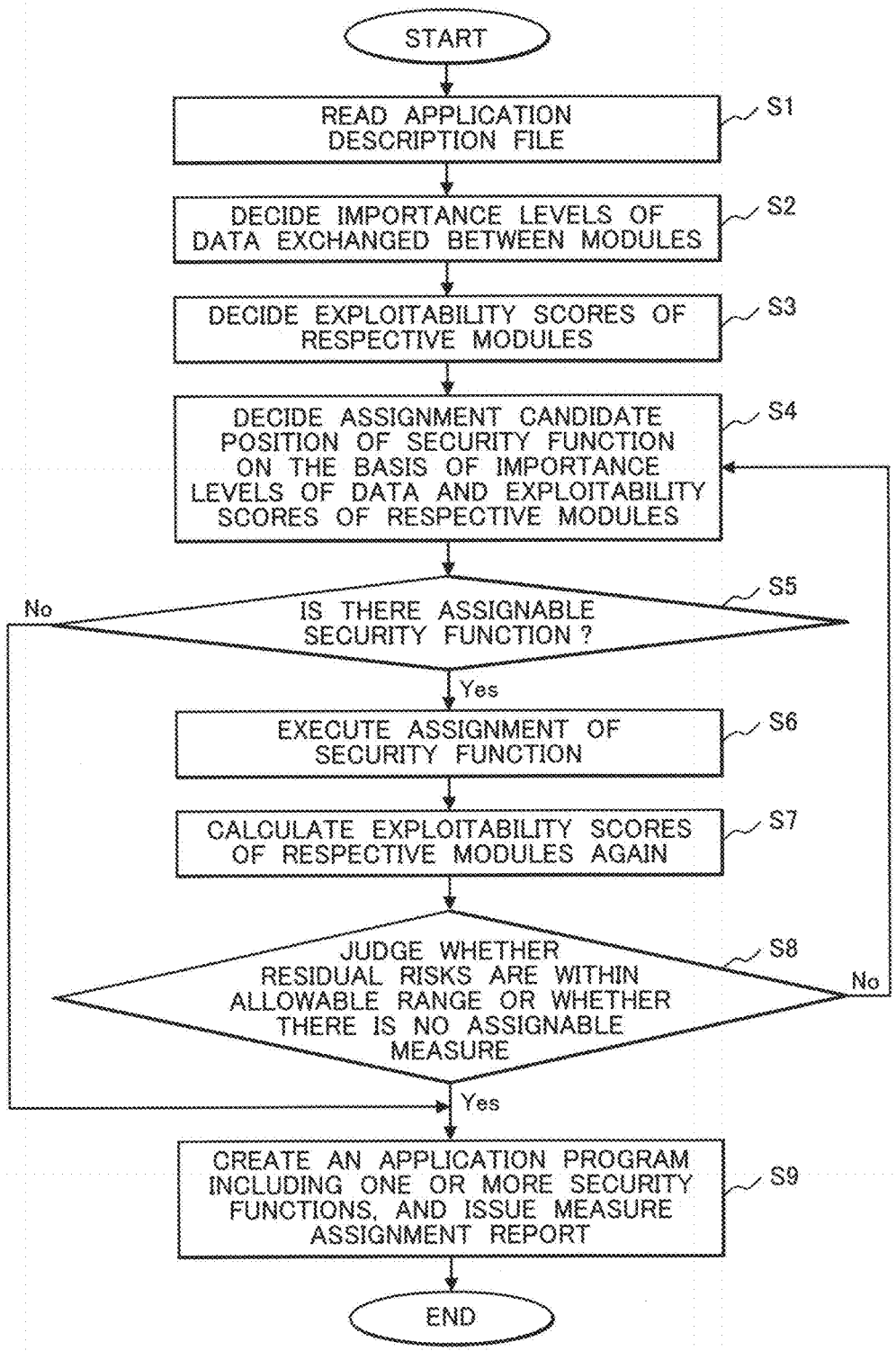
FIG. 2 is a flowchart showing an application development assistance method (main processing) according to the first embodiment of the present invention.
Figure 3:
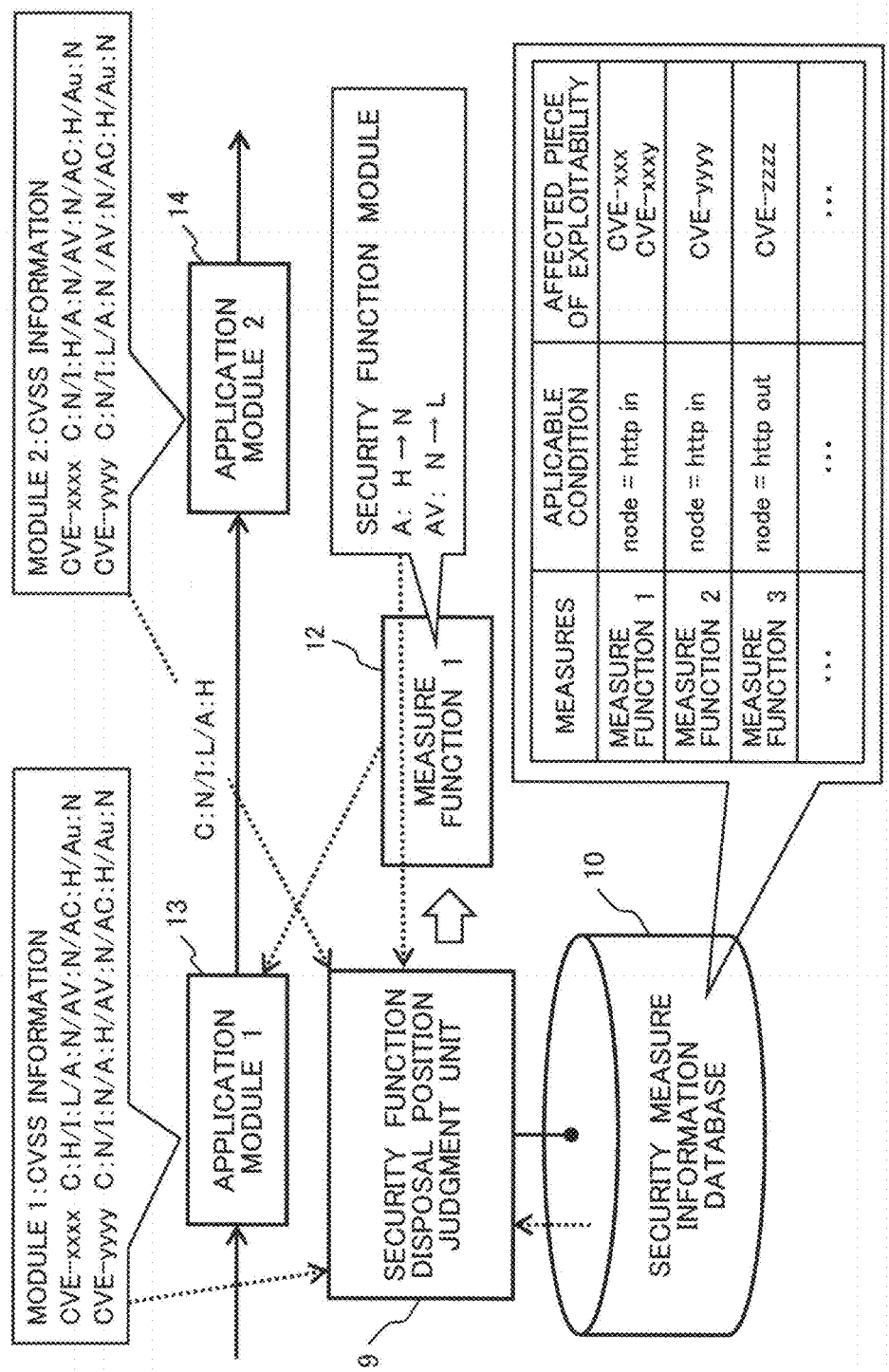
FIG. 3 is a diagram conceptually showing the assignment of security modules executed by a security function disposal position judgment unit according to the first embodiment of the present invention.

An application development assistance system and an application development assistance method according to a first embodiment of the present invention will be explained with reference to FIG. 1 to FIG. 3. FIG. 1 is a diagram showing the whole configuration of the application development assistance system according to the first embodiment. FIG. 2 is a flowchart showing the application development assistance method (main processing) according to this embodiment. FIG. 3 is a diagram conceptually showing the assignment of security modules (security functions) executed by the application development assistance system shown in FIG. 1.

As shown in FIG. 1, the application development assistance system 1 includes: an application file analysis unit 5; a data importance level judgment unit 6; a module exploitability judgment unit 7; a module exploitability database 8; a security function disposal position judgment unit 9; a security measure information database 10; and a program/report creation unit 11.

The application file analysis unit 5 analyses an input application description file 2 and obtains application data information and module information. The application data information is output to the data importance level judgment unit 6, and the module information is output to the module exploitability judgment unit 7. Here, the application description file 2 includes application flow (project) information. An application flow is made up of plural modules (Refer to FIG. 5).

The data importance level judgment unit 6 decides the importance levels of data exchanged between modules on the basis of the input application data information.

On the other hand, the module exploitability judgment unit 7 decides the exploitability score (module exploitability information: the number and degrees of pieces of "Exploitability") of each module on the basis of the input module information and exploitability information read out from the module exploitability database 8.

The security function disposal position judgment unit 9 decides the disposal positions of security modules (security functions) in the plural modules included in the application flow on the basis of data importance level information decided by the data importance level judgment unit 6, the exploitability score (module exploitability information) of each module decided by the module exploitability judgment unit 7, and security measure information read out from the security measure information database 10.

The security modules (security functions) are preferentially (selectively) assigned to positions where the exploitability scores of modules are higher in an application flow including plural modules having high exploitability scores and high importance levels of data exchanged between the plural modules.

The security function disposal information decided by the security function disposal position judgment unit 9 is input into the program/report creation unit 11. On the basis of the input security function disposal information, the program/report creation unit 11 creates an application program 3 and issues a security measure report 4. The created application program 3 becomes a secure computer program (application) in which optimal security measures are taken at positions in need of security measures.

Here, although a configuration example of the application development assistance system 1 in which the module exploitability database 8 and the security measure information database 10 are imbedded is shown in FIG. 1, alternatively conceivable is a configuration in which, while the module exploitability database 8 and the security measure information database 10 are installed outside of the application development assistance system 1, the module exploitability judgment unit 7 and the module exploitability database 8 are connected to each other via a communication network or the like and the security function disposal position judgment unit 9 and the security measure information database 10 are also connected to each other via a communication network or the like.

A main processing flow executed by the above-described application development assistance system 1 is shown in FIG. 2.

First, after an application description file is read and analyzed, application data information and module information are obtained (at Step S1).

Next, the importance levels of data exchanged between modules are decided on the basis of the obtained application data information (at Step S2).

Successively, the exploitability scores of the respective modules are decided on the basis of the obtained module information and exploitability information read out from the module exploitability database (at Step S3).

Next, the assignment candidate position (disposal position) of a security function is decided on the basis of the decided importance levels of data, the decided exploitability scores (information) of the respective modules, and security measure information read out from the security measure information database (at Step S4).

Successively, it is judged whether there is an assignable security module (security function) or not (at Step S5).

If it is judged that there is an assignable security module (security function) (Yes), the assignment of the assignable security module (security function) is executed (at Step S6).

On the other hand, if it is judged that there is no assignable security module (security function) (No), a security measure report to the effect that there is no assignable security module (security function) is issued (at Step S9), and this processing is finished.

After the assignable security module (security function) is assigned at Step S6, the exploitability scores of the respective modules are calculated again (at Step S7).

Next, whether residual risks are in an allowable range or not or whether there is no assignable measure or not is judged (at Step S8).

If it is judged that the residual risks are in the allowable range or there is no assignable measure (any assignable security function becomes nonexistent) (Yes), an application program including one or more security functions is created, and a measure assignment report is issued (at Step S9).

On the other hand, if it is judged that the residual risk is out of the allowable range and there is any assignable measure (any assignable security function exists) (No), the flow goes back to Step S4, and until it is judged that the residual risks are in the allowable range or there is no assignable measure (any assignable security function becomes nonexistent), a part of the processing flow from Step S4 to Step S8 is repeatedly executed.

The abovementioned assignment of security modules (security functions) executed by the security function disposal position judgment unit 9 is shown in FIG. 3.

In FIG. 3, an application module 1 (13) and an application module 2 (14) compose an application flow.

The security function disposal position judgment unit 9 decides a disposal position of a measure function 1 (12) on the basis of the CVSS information (module exploitability) of the application module 1 (13) and the CVSS information (module exploitability) of the application module 2 (14) that are weighted (scored in terms of exploitability) by the module exploitability judgment unit 7, security measure information read out from the security measure information database 10, and data (not shown) that is exchanged between the modules and weighted (given importance levels) by the data importance level judgment unit 6.

Combinations of applicable conditions and affected pieces of exploitability are stored as plural measure functions in the security measure information database 10.

As described above, in the application development assistance system and the application development assistance method according to this embodiment, security modules (security functions) are assigned at positions in the order of a position having the highest risk value to a position having the lowest risk value, and every time one security function module is assigned, the relevant exploitability decreases and therefore the total sum of risks changes, the exploitability scores of the respective modules are repeatedly calculated until the total sum of risks becomes a specified risk score (an acceptable risk score). The convergence condition is attained when the total sum of risks becomes an allowable state or any assignable security function module becomes nonexistent, and the repeated calculation of the exploitability scores is finished at this timing.

With this, because it is possible to take optimal security measures at positions in need of security measures under the application development environment using a flow diagram, an application in which optimal security measures are taken can be developed comparatively easily.

First Modification

Here, in the case where each module has a hierarchical functional block type module structure, the module exploitability judgment unit 7 can be configured to decide the exploitability score of each module on the basis of a data flow in each module and the exploitability scores of submodules included in each module.

With this, the exploitability of an abstracted module can be decided.

Second Modification

In addition, in the case where each module is made up of basic module groups, each of the basic module groups can be configured to have a unique exploitability score corresponding to the characteristic of each module.

With this, the exploitability of an unknown module can be decided with reference to a known module.

Third Modification

Furthermore, the security measure information stored in the security measure information database 10 includes reliability score information created on the basis of the reliabilities of measures, and security functions having higher reliabilities can be configured so as to be preferentially assigned on the basis of the reliability score information.

With this, it becomes possible to alleviate the malfunction risks of security functions.

Second Embodiment

Figure 4:
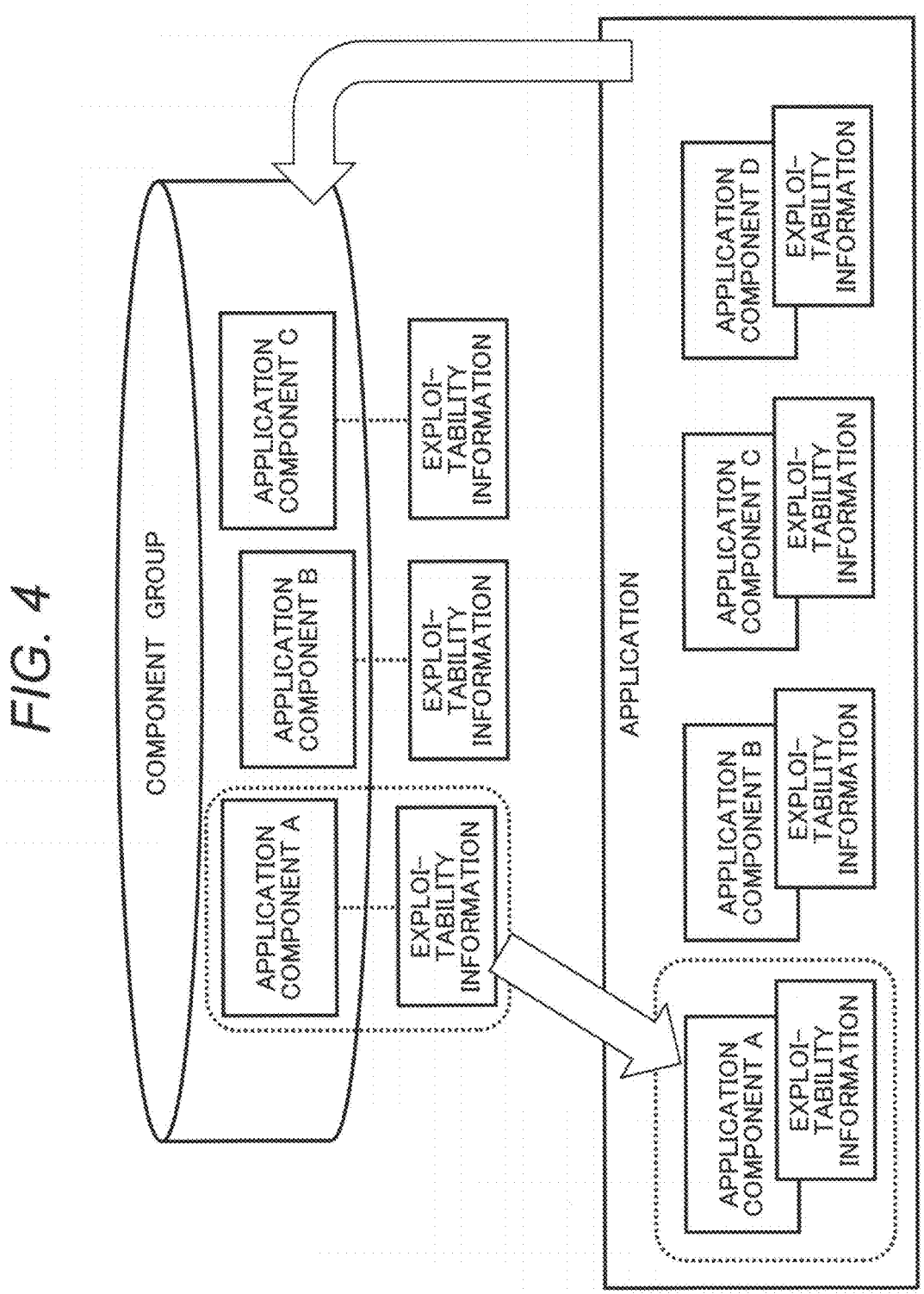
FIG. 4 is a diagram conceptually showing an application development platform according to a second embodiment of the present invention.

An application development platform according to a second embodiment of the present invention will be explained with reference to FIG. 4. FIG. 4 is a diagram conceptually showing the entire configuration of the application development platform according to this embodiment and shows an example of the usage cases of the present invention explained in the first embodiment.

As shown in FIG. 4, in the case where an application development is made using a component group (development platform) made up of application components A, B, and C that are respectively associated with pieces of exploitability information, a developer develops an application that executes a function needed by the developer on the basis of application components registered in the component group (development platform). In this case, the application development assistance system and the application development assistance method that are explained in the first embodiment are used.

An application component having high versatility is registered in the component group (development platform) as a new component and used for other application flows (projects) as well.

With this, in the case where a new application development is made, it is not necessary to take the security measure of an application component having high versatility into consideration anew, so that the period of the new application development can be shortened.

Third Embodiment

Figure 5:
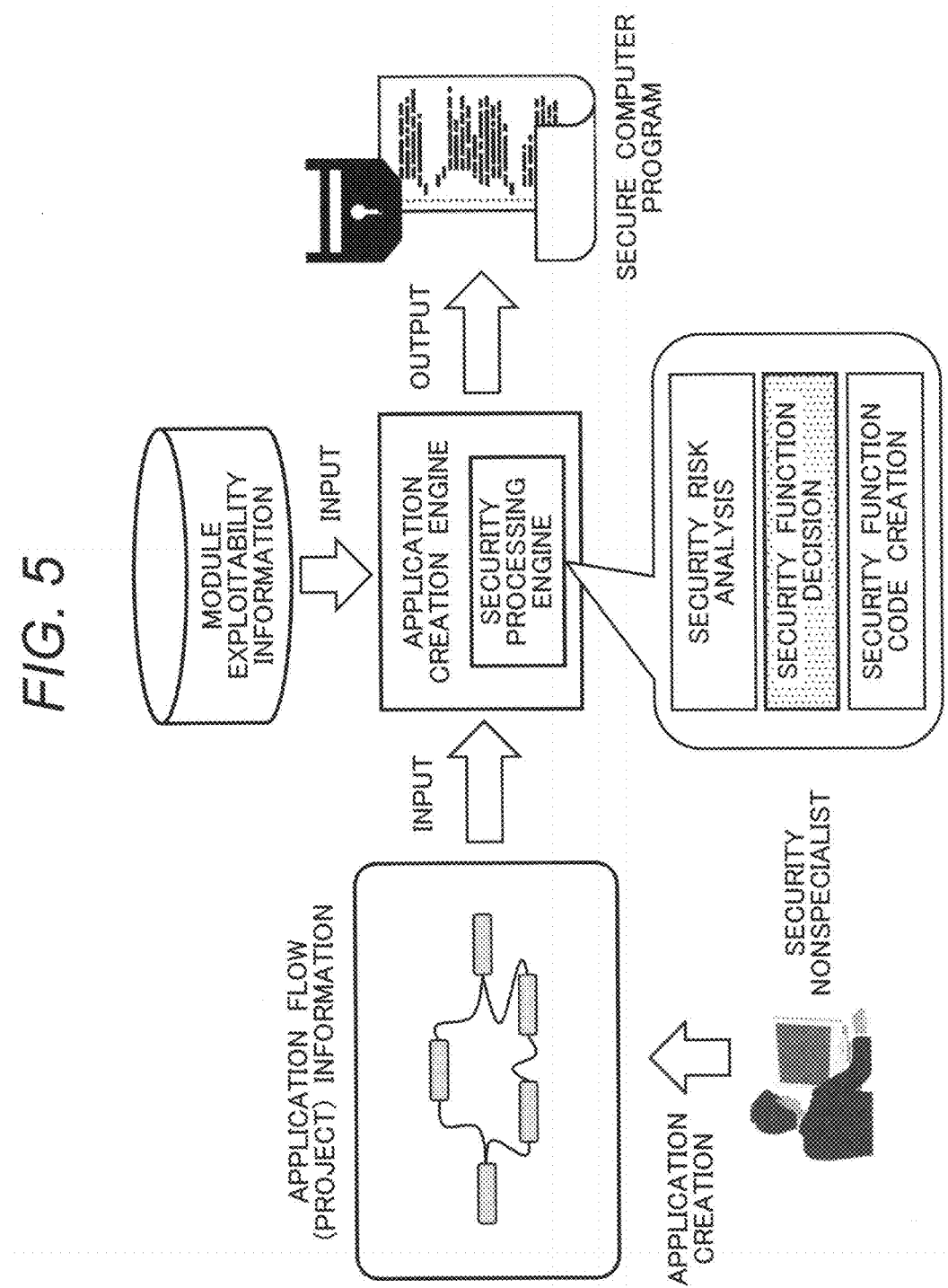
FIG. 5 is a diagram conceptually showing an application development system according to a third embodiment of the present invention.

An application development system according to a third embodiment of the present invention will be explained with reference to FIG. 5. FIG. 5 is a diagram conceptually showing the entire configuration of the application development system according to this embodiment and shows an example of the usage cases of the present invention explained in the first embodiment.

In FIG. 5, an application creation engine corresponds to the application development assistance system 1 according to the first embodiment (FIG. 1).

An application flow (project) information (corresponding to the application description file 2 in FIG. 1) made by a security nonspecialist and module exploitability information are input into the application creation engine, and a secure computer program (application) in which optimal security measures are taken at positions in need of security measures is output using three functions (security analysis, security function decision, and security function code creation) possessed by a security processing engine. The present invention is applied to the security function decision of the three functions of the security processing engine.

Here, the present invention is not limited to the above-described embodiments and can include various modifications. For example, the above embodiments have been described in detail to help understand the present invention, and the present invention is not necessarily limited to the embodiments including all the configurations that have been described so far. Furthermore, a part of the configuration of one embodiment can be replaced with a part of the configuration of another embodiment, and it is also possible to add the configuration of one embodiment to the configuration of another embodiment. In addition, a new embodiment of the present invention may be made by adding another configuration to a part of the configuration of each embodiment, by deleting a part of the configuration from each embodiment, or by replacing a part of configuration of each embodiment with another configuration.

REFERENCE SIGNS LIST

1 . . . Application development assistance system
2 . . . Application description file
3 . . . Application program
4 . . . Security measure report
5 . . . Application file analysis unit
6 . . . Data importance level judgment unit
7 . . . Module exploitability judgment unit
8 . . . Module exploitability database
9 . . . Security function disposal position judgment unit
10 . . . Security measure information database
11 . . . Program/report creation unit
12 . . . Measure function 1
13 . . . Application module 1
14 . . . Application module 2

What is claimed is:

1. An application development assistance system for assisting an application development using a flow diagram, comprising:
  a computer, programmed to:
  analyze an input application description file and outputting application data information and module information,
  determine importance levels of data exchanged between modules on the basis of the application data information,
  determining an exploitability score of each module on the basis of the module information and exploitability information read out from a module exploitability database,
  determine disposal positions of security functions based on determined data importance level information, the determined exploitability score of each module, and security measure information read out from a security measure information database,
  wherein the respective modules compose application flows, and
  wherein security functions are assigned to disposal positions where the exploitability scores of modules are relatively higher in an application flow including plural modules having relatively high exploitability scores and relatively high importance levels of data exchanged between the plural modules.

2. The application development assistance system according to claim 1,
  wherein each module has a hierarchical functional block type module structure, and
  wherein the computer is programmed to determine the exploitability score of each module based on a data flow in each module and exploitability scores of submodules included in each module.

3. The application development assistance system according to claim 1,
wherein each module includes basic module groups, and
wherein each of the basic module groups has a unique exploitability score corresponding to a characteristic of each module.

4. The application development assistance system according to claim 1,
wherein security measure information stored in the security measure information database includes reliability score information created on the basis of reliabilities of measures, and
wherein a highly reliable security function is preferentially assigned on the basis of the reliability score information.

5. An application development assistance method for assisting an application development using a flow diagram, comprising the steps of:
reading and analyzing an application description file and obtaining application data information and module information;
determining importance levels of data exchanged between modules based on the application data information;
determining an exploitability score of each module based on the module information and exploitability information read out from a module exploitability database;
determining disposal positions of security functions on the basis of the importance levels of the data exchanged between the modules, the exploitability score of each module, and security measure information read out from a security measure information database;
composing application flows with the respective modules; and
assigning security functions to positions where the exploitability scores of modules are relatively higher in an application flow including plural modules having relatively high exploitability scores and relatively high importance levels of data exchanged between the plural modules.

6. The application development assistance method according to claim 5, comprising the steps of:
making each module have a hierarchical functional block type structure; and
deciding the exploitability score of each module on the basis of a data flow in each module and exploitability scores of submodules included in each module.

7. The application development assistance method according to claim 5, comprising the steps of:
making each module include basic module groups; and
making each of the basic module groups have a unique exploitability score corresponding to a characteristic of each module.

8. The application development assistance method according to claim 5, comprising the steps of:
making the security measure information include reliability score information created on the basis of reliabilities of measures; and
preferentially assigning a highly reliable security function on the basis of the reliability score information.

* * * * *